United States Patent
Sang et al.

(10) Patent No.: US 11,834,374 B2
(45) Date of Patent: Dec. 5, 2023

(54) ACCELERATOR COMPRISING STARCH, AND RELATED BOARD, SLURRIES, AND METHODS

(71) Applicant: United States Gypsum Company, Chicago, IL (US)

(72) Inventors: Yijun Sang, Oak Park, IL (US); Mark K. Hemphill, Hawthorn Woods, IL (US); Yongman Kim, Buffalo Grove, IL (US); James W. Barber, Chicago, IL (US)

(73) Assignee: UNITED STATES GYPSUM COMPANY, Chicago, IL (US)

(*) Notice: Subject to any disclaimer, the term of this patent is extended or adjusted under 35 U.S.C. 154(b) by 577 days.

(21) Appl. No.: 16/126,953

(22) Filed: Sep. 10, 2018

(65) Prior Publication Data
US 2019/0322584 A1   Oct. 24, 2019

Related U.S. Application Data

(60) Provisional application No. 62/660,073, filed on Apr. 19, 2018.

(51) Int. Cl.
*C04B 24/10* (2006.01)
*C04B 28/14* (2006.01)
(Continued)

(52) U.S. Cl.
CPC ............ *C04B 28/14* (2013.01); *C04B 11/024* (2013.01); *C04B 11/032* (2013.01);
(Continued)

(58) Field of Classification Search
CPC ...... C04B 24/38; C04B 2103/12; C04B 28/14; C04B 40/0042; C04B 20/026;
(Continued)

(56) References Cited

U.S. PATENT DOCUMENTS 3,573,947 A   4/1971   Kinkade et al.
3,920,465 A   11/1975  Burkard et al.
(Continued)

FOREIGN PATENT DOCUMENTS

EP   0003705 A2   8/1979

OTHER PUBLICATIONS

Wang et al., "Preparation of a Crosslinking Cassava Starch Adhesive and its Application in Coating Paper," BioResources 8(3), 2013, pp. 3574-3589.
(Continued)

*Primary Examiner* — Shuangyi Abu Ali
(74) *Attorney, Agent, or Firm* — Greer, Burns & Crain, Ltd.; Philip T. Petti; Pradip Sahu

(57) ABSTRACT

An accelerator for accelerating the rate of hydration of calcined gypsum is disclosed. The accelerator comprises calcium sulfate dihydrate particles and a starch. The starch has a cold water solubility of at least about 25% (e.g., at least about 35%) and a viscosity of about 25 Brabender Units (BU) or less when the starch is in a 30% aqueous slurry at 92° C. Also disclosed are a method of preparing an accelerator, method of hydrating stucco to form set gypsum, slurry, and method of making gypsum board.

12 Claims, 8 Drawing Sheets

(51) Int. Cl.
    *C04B 38/00*     (2006.01)
    *C04B 11/024*     (2006.01)
    *C04B 11/032*     (2006.01)
    *C04B 11/26*     (2006.01)
    *C04B 40/00*     (2006.01)
    *C04B 24/38*     (2006.01)
    *C04B 111/00*     (2006.01)
    *C04B 103/12*     (2006.01)

(52) U.S. Cl.
    CPC ............ *C04B 11/268* (2013.01); *C04B 24/38* (2013.01); *C04B 40/0039* (2013.01); *C04B 2103/12* (2013.01); *C04B 2111/0062* (2013.01); *C04B 2201/10* (2013.01)

(58) Field of Classification Search
    CPC ..... C04B 22/143; C04B 22/16; C04B 11/024; C04B 11/032; C04B 11/268; C04B 2111/0062; C04B 2201/10; C04B 40/0039
    See application file for complete search history.

(56) References Cited

U.S. PATENT DOCUMENTS

| | | |
|---|---|---|
| 3,947,285 A | 3/1976 | Jones et al. |
| 4,019,920 A * | 4/1977 | Burkard .................. C04B 28/14 106/780 |
| 4,054,461 A | 10/1977 | Martin |
| 5,643,510 A | 7/1997 | Sucech |
| 5,683,635 A | 11/1997 | Sucech et al. |
| 6,342,284 B1 | 1/2002 | Yu et al. |
| 6,409,825 B1 | 6/2002 | Yu et al. |
| 6,494,609 B1 | 12/2002 | Wittbold et al. |
| 6,632,550 B1 | 10/2003 | Yu et al. |
| 6,815,049 B2 | 11/2004 | Veeramasuneni et al. |
| 6,822,033 B2 | 11/2004 | Yu et al. |
| 6,874,930 B2 | 4/2005 | Wittbold et al. |
| 7,364,676 B2 | 4/2008 | Sucech et al. |
| 8,016,960 B2 | 9/2011 | Wittbold et al. |
| 9,540,810 B2 | 1/2017 | Sang et al. |
| 9,828,441 B2 | 11/2017 | Sang et al. |
| 10,399,899 B2 | 9/2019 | Sang et al. |
| 10,421,250 B2 | 9/2019 | Li et al. |
| 10,421,251 B2 | 9/2019 | Li et al. |
| 2006/0243171 A1 | 11/2006 | Yu et al. |
| 2007/0048490 A1 | 3/2007 | Yu et al. |
| 2008/0090068 A1 | 4/2008 | Yu |
| 2010/0247937 A1 | 9/2010 | Liu et al. |
| 2012/0168527 A1 | 7/2012 | Li et al. |
| 2012/0170403 A1 | 7/2012 | Li et al. |
| 2014/0113128 A1 | 4/2014 | Sang et al. |
| 2014/0326166 A1* | 11/2014 | Mesnager ............... C08B 30/18 106/205.01 |
| 2015/0010767 A1* | 1/2015 | Sang ....................... C04B 28/14 428/532 |
| 2016/0375656 A1 | 12/2016 | Li et al. |
| 2016/0376191 A1 | 12/2016 | Li et al. |
| 2017/0362124 A1 | 12/2017 | Sang et al. |
| 2019/0062215 A1 | 2/2019 | Lu et al. |

OTHER PUBLICATIONS

Proquip, Inc., Viscosity Converstion Chart, Macedonia, Ohio, 2014, https://proquipinc.com/wp-content/uploads/2014/04/viscosity_conversion_chart.pdf, 1 page.

International Search Report and Written Opinion in PCT Application No. PCT/US2018/052786 dated Dec. 14, 2018.

* cited by examiner

ACCELERATOR COMPRISING STARCH, AND RELATED BOARD, SLURRIES, AND METHODS

CROSS-REFERENCE TO RELATED APPLICATION

This patent application claims the benefit of U.S. Provisional Patent Application No. 62/660,073, filed Apr. 19, 2018, and entitled, "Accelerator Comprising Starch, and Related Board, Slurries, and Methods," which preceding patent application is incorporated herein by reference in its entirety.

BACKGROUND OF THE INVENTION

Set gypsum is a well-known material that is used in many products, including panels and other products for building construction and remodeling. One such panel (often referred to as gypsum board) is in the form of a set gypsum core sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

Gypsum (calcium sulfate dihydrate) is naturally occurring and can be mined in rock form. It can also be in synthetic form (referred to as "syngyp" in the art) as a by-product of industrial processes such as flue gas desulfurization. From either source (natural or synthetic), gypsum can be calcined at high temperature to form stucco (i.e., calcined gypsum in the form of calcium sulfate hemihydrate and/or calcium sulfate anhydrite) and then rehydrated to form set gypsum in a desired shape (e.g., as a board). During manufacture of the board, the stucco, water, and other ingredients as appropriate are mixed, typically in a pin mixer as the term is used in the art. A slurry is thusly formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of an interlocking matrix of set gypsum crystals, thereby imparting strength to the gypsum structure in the product. Heat is required (e.g., in a kiln) to drive off the remaining free (i.e., unreacted) water to yield a dry product.

Accelerator materials are often included in the slurry in order to enhance the efficiency of hydration and to control set time. Typically, the accelerator material includes finely ground dry calcium sulfate dihydrate particles, sometimes referred to as "gypsum seeds." The gypsum particles are believed to enhance nucleation of the set gypsum crystals, thereby increasing the crystallization rate thereof. As is known in the art, gypsum particle accelerator materials progressively lose their effectiveness upon aging, even under normal conditions. In this respect, some efficiency of the accelerator is lost even as it is ground, and the gypsum seeds dramatically lose potency over time during handling or storage. The loss of acceleration efficiency of conventional accelerator materials is exacerbated when the accelerator is exposed to heat and/or moisture.

To combat the loss of efficiency of the gypsum seeds over time, particularly under conditions of heat, it is customary to coat the calcium sulfate dihydrate accelerator material with any of a number of known coating agents, such as, for example, sugars, including sucrose, dextrose and the like, starch, boric acid, or long chained fatty carboxylic acids including salts thereof. Conventional heat resistant accelerator materials are both ground and provided in dry form inasmuch as an accelerator loses efficiency upon contact with moisture, for example, because the accelerator particles undesirably agglomerate and/or because the coating agents often are soluble in water.

Accelerators are described, for example, in U.S. Pat. Nos. 3,573,947; 3,920,465; 3,947,285; and 4,054,461. Another example is a wet gypsum accelerator (WGA), which comprises particles of calcium sulfate dihydrate, water, and at least one additive, as described in U.S. Pat. Nos. 6,409,825 and 8,016,960, and in commonly assigned U.S. Patent Application Publication 2006/0243171.

Despite the availability of the foregoing approaches, conventional accelerator materials still can be stored only for a few days such that the accelerator material must be prepared freshly a short time prior to use. Accordingly, conventional accelerator materials cannot be stored for more than a few hours or transported over long distances and then used. Furthermore, conventional accelerator materials are relatively expensive to make because commonly used additives, such as sugar, have high raw material costs. WGA has been found to be not fully satisfactory for ultra-light weight boards because board strength can be negatively impacted.

Accordingly, it will be appreciated that there is a need in the art for an accelerator material that has relatively low cost to prepare, does not lose its effectiveness over long periods of time, and does not compromise strength in ultra-light weight gypsum board.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

The inventors have made the surprising and unexpected discovery of novel materials for accelerating the rate of hydration of calcined gypsum (stucco) to set gypsum. The accelerator material includes particles of calcium sulfate dihydrate (i.e., gypsum) and a soluble starch having a cold water solubility of at least about 25% (e.g., at least about 35%) and a viscosity of about 25 Brabender Units (BU) or less when the starch is tested in a 30% aqueous slurry at 92° C. The soluble starch can be, for example, an acid-hydrolyzed starch. The accelerator can be used in a stucco slurry (sometimes called a gypsum slurry) to make gypsum board, and further allows for modulation of the rate of hydration of the calcined gypsum to set gypsum as desired. In preferred embodiments, the accelerator is heat resistant and can be stored for prolonged periods. Thus, in various embodiments the present disclosure provides an accelerator, method of preparing an accelerator, method of hydrating stucco to form set gypsum, slurry, or method of making gypsum board, as described herein.

In one aspect, the present disclosure provides an accelerator. The accelerator comprises particles of calcium sulfate dihydrate and starch. The starch has a cold water solubility of at least about 25% (e.g., at least about 35%) and a viscosity of about 25 Brabender Units (BU) or less when the starch is in a 30% aqueous slurry at 92° C.

In another aspect, the present disclosure provides a method of preparing an accelerator. The method comprises providing a mixture comprising calcium sulfate dihydrate and a starch. The starch has a cold water solubility of at least about 25% (e.g., at least about 35%) and a viscosity of about 25 Brabender Units (BU) or less when the starch is in a 30% aqueous slurry at 92° C. The method further comprises grinding the calcium sulfate dihydrate in the presence of the starch to form the accelerator.

In another aspect, the present disclosure provides a method of hydrating calcined gypsum to form set gypsum. The method comprises forming a mixture comprising calcined gypsum, water, and an accelerator. The accelerator comprises calcium sulfate dihydrate particles and starch. The starch has a cold water solubility of at least about 25% (e.g., at least about 35%) and a viscosity of about 25 Brabender Units (BU) or less when the starch is in a 30% aqueous slurry at 92° C. In some embodiments, the rate of hydration can be modulated by adjusting the amount of accelerator included in the calcined gypsum (stucco) slurry (e.g., by increasing the amount of accelerator to increase the rate of hydration or decreasing the amount of accelerator to decrease the rate of hydration).

In another aspect, the present disclosure provides a method of preparing gypsum board. The method comprises: providing a first cover sheet, mixing a slurry, disposing the slurry between the first cover sheet and a second cover sheet to form an assembly, cutting the assembly into a board, and drying the board. The slurry is comprised of stucco, water, and an accelerator. The accelerator comprises calcium sulfate dihydrate particles and starch. The starch has a cold water solubility of at least about 25% (e.g., at least about 35%), and a viscosity of about 25 Brabender Units (BU) or less when the starch is in a 30% aqueous starch slurry at 92° C. The slurry faces the inner surfaces of the respective cover sheets.

In another aspect, the present disclosure provides a slurry. The slurry comprises stucco, water, and an accelerator. The accelerator comprises calcium sulfate dihydrate particles and starch having a cold water solubility of at least about 25% (e.g., at least about 35%) and a viscosity of about 25 Brabender Units (BU) or less when the starch is in a 30% aqueous slurry at 92° C. Preferably, when the slurry is used to make a gypsum core disposed between two cover sheets in a board having a density of about 35 pounds per cubic foot (560 kg/m³) or less, the board has a nail pull resistance of at least about 65 lbs-f (e.g., at least about 68 lbs-f, at least about 72 lbs-f, at least about 77 lbs-f, etc.) according to ASTM 473-10, method B.

In another aspect, the present disclosure provides a gypsum board. The gypsum board comprises a core layer and a concentrated layer. The concentrated layer is disposed between the core layer and a top (face) cover sheet. The core layer has a first face and a second face, and comprises set gypsum formed from a first slurry comprising water and stucco, and, optionally, accelerator. The concentrated layer is formed from a second slurry comprising stucco, water, and the accelerator. The accelerator comprises calcium sulfate dihydrate particles and starch having a cold water solubility of at least about 25% (e.g., at least about 35%) and a viscosity of about 25 Brabender Units (BU) or less when the starch is in a 30% aqueous slurry at 92° C. The concentrated layer is disposed in bonding relation to the first core face. The second core face can face a bottom (back) cover sheet, with a skim coat or second concentrated layer optionally therebetween. Optionally, the gypsum board exhibits one or more of the following: the concentrated layer has an average core hardness that is at least about 1.5 times greater than the average core hardness of the board core; when the accelerator is present in forming the core, the concentrated layer is formed from at least about 1.2 times the heat resistant accelerator used in forming the board core; the board core has a dry density of about 30 pcf or less; the concentrated layer has a dry density of at least about 1.1 times higher than the dry density of the board core; and the first slurry has a first water-stucco ratio and the second slurry has a second water-stucco ratio, the second water-stucco ratio being at least about 1.2 times higher than the first water-stucco ratio.

In another aspect, the present disclosure provides a gypsum board. The gypsum board comprises a set gypsum layer disposed between two cover sheets. The gypsum layer is formed from a slurry. The slurry comprises stucco, water, and an accelerator. The accelerator comprises calcium sulfate dihydrate particles and starch having a cold water solubility of at least about 25% (e.g., at least about 35%) and a viscosity of about 25 Brabender Units (BU) or less when the starch is in a 30% aqueous slurry at 92° C. The board has a density of about 35 pounds per cubic foot (560 kg/m3) or less, and a nail pull resistance of at least about 65 lbs-f (e.g., at least about 68 lbs-f, at least about 72 lbs-f, at least about 77 lbs-f, etc.) according to ASTM 473-10, method B.

BRIEF DESCRIPTION OF THE DRAWING(S)

DETAILED DESCRIPTION OF THE INVENTION

Figure 1:
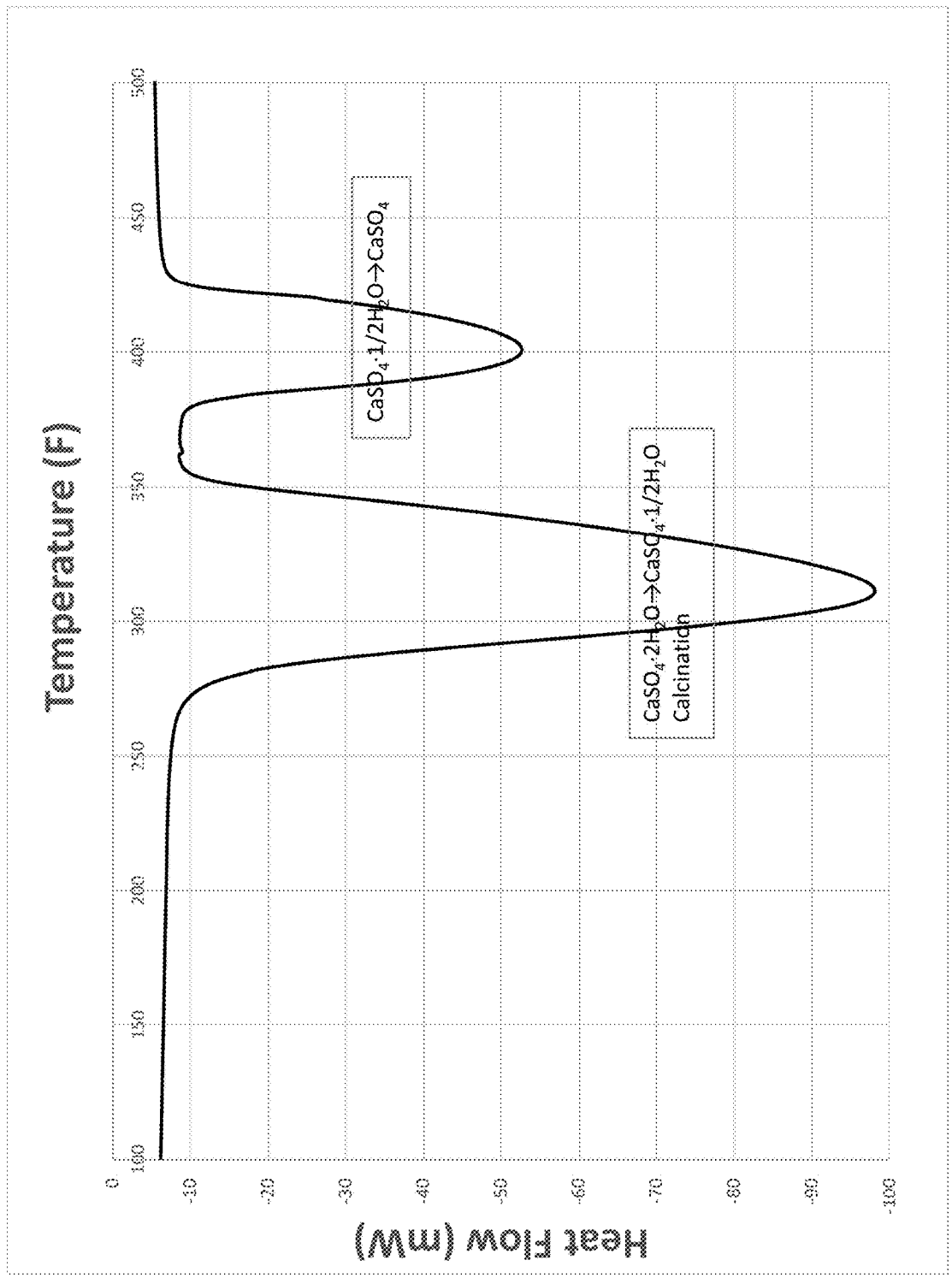
FIG. 1 is a graph of heat flow (Y-axis) versus temperature (X-axis) of the endothermal reactions that gypsum (calcium sulfate dihydrate) undergoes to dehydrate while heating as described in Example 2.

The present disclosure is predicated, at least in part, on the surprising and unexpected discovery of novel accelerator materials containing calcium sulfate dihydrate particles and a soluble starch having high cold-water solubility (i.e., at least about 25%, e.g., at least about 35%) and low viscosity (i.e., about 25 Brabender Units or less). The materials are used to accelerate the rate of hydration of calcined gypsum to set gypsum. As such, the accelerator materials can be used in manufacturing gypsum board, e.g., wallboard. It will be understood that the term "wallboard" is not limited to use on wall surfaces, but also can refer to gypsum board used on ceilings, partitions, etc. The soluble starch is typically acid-modified. In preferred embodiments, the accelerator is heat resistant such that it is able to maintain its efficiency after storage in a warm environment. The accelerator can be prepared by, for example, co-grinding dry particles of calcium sulfate dihydrate (referred to as gypsum or land plaster) using, e.g., a ball mill under controlled temperature (e.g., from about 80° F. (~26° C.) to about 150° F. (~65° C.), such as from about 90° F. (~32° C.) to about 130° F. (~54° C.)).

After co-grinding the calcium sulfate dihydrate and starch particles together, the resulting accelerator is in the form of a mixture containing calcium sulfate dihydrate particles and starch where the starch can be considered as coating the calcium sulfate dihydrate particles. As used herein, coating refers to the starch's protection of the active surface of the calcium sulfate dihydrate particles. The protection can include resistance to heat, maintenance of accelerator efficiency even after storage for prolonged periods, etc. In some embodiments, after co-grinding, the accelerator contains calcium sulfate particles having a median particle size of from about 20 μm to about 80 μm, such as from about 40 μm to about 60 μm. Without wishing to be bound by any particular theory, such particle sizes are believed to be desirable because of a desirable surface area to grow gypsum crystals.

Accelerators according to embodiments of the disclosure can be ground for any suitable amount of time (e.g., at least about 5 minutes, such as at least about 10 minutes, etc.). For example, in various embodiments, the grinding occurs for a period of from about 5 minutes to about 90 minutes, e.g., from about 5 minutes to about 80 minutes, from about 5 minutes to about 70 minutes, from about 5 minutes to about 60 minutes, from about 5 minutes to about 50 minutes, from about 5 minutes to about 40 minutes, from about 5 minutes to about 30 minutes, from about 5 minutes to about 20 minutes, from about 5 minutes to about 10 minutes, from about 10 minutes to about 80 minutes, from about 10 minutes to about 70 minutes, from about 10 minutes to about 60 minutes, from about 10 minutes to about 50 minutes, from about 10 minutes to about 40 minutes, from about 10 minutes to about 30 minutes, from about 10 minutes to about 20 minutes, from about 20 minutes to about 90 minutes, from about 20 minutes to about 80 minutes, from about 20 minutes to about 75 minutes, from about 20 minutes to about 65 minutes, from about 20 minutes to about 60 minutes, from about 20 minutes to about 50 minutes, from about 30 minutes to about 90 minutes, from about 30 minutes to about 75 minutes, from about 30 minutes to about 65 minutes, from about 30 minutes to about 60 minutes, from about 30 minutes to about 50 minutes, from about 45 minutes to about 90 minutes, from about 45 minutes to about 75 minutes, from about 45 minutes to about 65 minutes, from about 45 minutes to about 60 minutes, from about 50 minutes to about 90 minutes, from about 50 minutes to about 75 minutes, from about 50 minutes to about 65 minutes, or from about 50 minutes to about 60 minutes, etc.

The accelerator can have any suitable temperature when ball milling is completed, e.g., when the accelerator is added to the stucco slurry for making product. A low temperature is favorable, which reduces the risk of calcination during the ball mill process. For example, in some embodiments, the accelerator can have a temperature of from about 20° C. to about 40° C., such as from about 25° C. to about 35° C. Sometimes, intense ball milling is desirable to activate the accelerator and improve accelerator efficiency. Intense grinding can occur through longer grinding times (e.g., at least about 30 minutes, such as from about 30 minutes to about 90 minutes). More active sites on the surface of the gypsum particles are generally exposed through the intense grinding. The accelerator is activated and efficiency is improved as the grinding changes the gypsum particle surface properties to expose more active sites on the gypsum seeds and allow for calcium sulfate dihydrate (from the stucco slurry) to deposit on the exposed areas to grow crystals with more rapid setting. The intense milling can result in higher temperature (e.g., from about 40° C. to about 70° C.) and cause susceptibility to partial calcination. In some embodiments, the presence of the starch as described herein can reduce or avoid calcination. In addition, if desired, to avoid calcination, the ball mill can be wrapped with a water jacket in some embodiments where running water (e.g., tap water) inside the jacket can further protect the gypsum particles from calcination.

Materials for Making the Accelerator

The dry gypsum (e.g., from a natural source or synthetically prepared) used to prepare the accelerator can have any suitable median particle size prior to co-grinding. For example, in some embodiments, the calcium sulfate dihydrate can have a median particle size prior to co-grinding of from about 100 microns to about 250 microns, e.g., from about 100 microns to about 200 microns, from about 100 microns to about 150 microns, from about 100 microns to about 130 microns, from about 120 microns to about 150 microns, from about 120 microns to about 140 microns, from about 130 microns to about 150 microns, etc. By way of example, median particle size can be determined by laser scattering analysis and/or other appropriate techniques. Suitable laser scattering instruments are available from, for example, Horiba, Microtrack, and Malvern Instruments.

The dry gypsum used in accordance with the disclosure is preferably flowable and substantially free from excess moisture. The flowability and limiting of moisture are desirable to avoid lumping or caking, which can clog the ball mill and introduce inefficiencies in the ball milling process. Typically, the dry gypsum of the present disclosure has a moisture content of under 1%, such as about 0.5% or less, or about 0.3% or less. In some embodiments, the dry gypsum has a moisture content of about 0.2% or less, about 0.1% or less, about 0.05% or less, or about 0%.

The ground gypsum used in the accelerator can have any suitable particle size distribution. The particle size distribution will depend, at least in part, on the nature of the milling equipment used to grind dry gypsum (if applicable), for example, the size of the ball mill and the grinding medium used to prepare the ground gypsum. As is known to the skilled artisan, particle size distribution is often reported using d(0.1), d(0.5), and d(0.9) values, which describe the shape of the particle size distribution. Typically, the dry gypsum has a d(0.9) value of about 200 microns or less, a d(0.5) value of about 40 microns or less, and a d(0.1) value of about 3 microns or less. Preferably, the dry gypsum has a d(0.9) value of about 180 microns or less, about 160 microns or less, or about 120 microns or less; a d(0.5) value of about 30 microns or less, about 20 microns or less; and a d(0.1) value of about 2 microns or less, about 1 microns or less.

The ground gypsum used in the accelerator can have any suitable surface area. Typically, the dry gypsum has a surface area of about 0.15 m$^2$/g or more, as determined by laser scattering analysis. Preferably, the dry gypsum has a surface area of about 0.18 m$^2$/g or more or about 0.2 m$^2$/g or more. Generally, the dry gypsum has a surface area of about 5 m$^2$/g or less, about 3 m$^2$/g or less, or about 2 m$^2$/g or less. In a preferred embodiment, the dry gypsum has a surface area of from about 0.15 m$^2$/g to about 3 m$^2$/g, or from about 0.2 m$^2$/g to about 2 m$^2$/g.

The present inventors have discovered that using a starch with the desired level of cold-water solubility and low viscosity in the accelerator surprisingly and unexpectedly had better efficiency than the use of conventional acid-modified starch (sometimes referred to as migrating starch in the art because of the starch's propensity to migrate to the interface between the board core and the cover sheets when such starch is included in the stucco slurry). While not wishing to be bound by any particular theory, it is believed that starch that is more insoluble (e.g., having solubility of less than 25%) and starch with high viscosity (e.g., having a viscosity higher than 25 BU) do not coat (protect) the gypsum particles well. In contrast, the soluble starch with higher cold-water solubility and low viscosity, results in improved accelerator protection, efficiency, and/or heat resistance.

Any suitable type of raw starch material can be used in forming the soluble starch with high cold-water solubility and low viscosity as described herein. As used herein, the starch material can be a material (such as flour) that includes a starch component of any suitable proportion (e.g., a starch component of 75% or higher in the material). For example, in some embodiments, the starch material can be in the form of corn starch, pea starch, wheat starch, alkylated starch, oxidized starch, flour-containing starch such as corn flour, etc. The dry starch used to prepare the accelerator can have any suitable particle size prior to co-grinding. Such particle sizes are desirable in some embodiments because it prevents agglomeration of the ground gypsum. For example, in some embodiments, prior to co-grinding the starch can have a median particle size from about 10 microns to about 80 microns, e.g., from about 20 microns to about 60 microns, from about 20 microns to about 50 microns, or from about 20 microns to about 40 microns.

The soluble starch according to the present disclosure is typically acid-modified or enzyme modified for hydrolysis to reduce molecular weight. While not wishing to be bound by any particular theory, it is believed that the acid or enzyme modification cleaves maltodextrins off the starch macromolecules. To prepare acid-modified starches, it will be appreciated that either an aqueous acidic suspension of unmodified starch or a dry mixture (<20% moisture) of unmodified starch and an acid can be treated at an elevated temperature. By adjusting reaction time, acid level and reaction temperature, the degree of depolymerization can be modified. For example, when the proper fluidity is achieved, e.g., as determined by in-process laboratory controls, the acid hydrolysis reaction can be stopped by neutralizing the acid or reducing the temperature to room temperature. Thus, acid-modified starches can be prepared in various fluidities. Also, acid-modified starches may be used directly or after neutralization without further purification. The most commonly used starch-converting enzyme is α-amylase (alpha-amylase). The enzyme hydrolysis reaction can be stopped either by adjusting the pH or by heating.

The soluble starch has a high cold-water solubility, i.e., greater than about 25% (e.g., at least about 35%). In various embodiments, any upper limit of cold-water solubility can be effective (up to 100%) so long as the soluble starch also has the low viscosity described herein. For example, in some embodiments, the soluble starch has a cold-water solubility of at least about 30%, at least about 35%, at least about 40%, at least about 45%, at least about 50%, etc. In some embodiments, the soluble starch has a cold-water solubility of, for example, from about 25% to about 95%, from 25% to about 90%, from about 25% to about 80%, from about 25% to about 70%, from about 25% to about 60%, from about 25% to about 50%, from about 25% to about 40%, from about 30% to about 95%, from about 30% to about 90%, from about 30% to about 80%, from about 30% to about 60%, from about 30% to about 50%, from about 30% to about 70%, from about 35% to about 95%, from about 35% to about 90%, from about 35% to about 80%, from about 35% to about 70%, from about 35% to about 60%, from about 35% to about 50%, from about 40% to about 95%, from about 40% to about 90%, from about 40% to about 80%, from about 40% to about 70%, from about 40% to about 60%, from about 40% to about 50%, etc.

The cold-water solubility of the starch is measured by the following method. A wet starch is formed by adding water (80 mL, room temperature (25° C.)) and dry starch (4.000 g) to a beaker with stirring. The wet starch is stirred for 20 minutes, and then transferred into a 100 ml graduated cylinder. Water is added up to the 100 mL line, and then the cylinder is inverted three times to mix the slurry. The wet starch is allowed to stand for 30 minutes at room temperature. The supernatant (10 g) is transferred from the top of the slurry into a tared pan. After the pan is heated overnight (43° C.), the remaining solids are weighed. The solubility (%) of the starch is set forth in the equation: Solubility (%)=Weight of soluble solid/(0.4×100).

The viscosity is measured according to the Brabender method when the starch is in a 30% aqueous slurry at 92° C. According to the Brabender viscosity measurement procedure as referred to herein, viscosity is measured using a C. W. Brabender Viscograph, e.g., a Viscograph-E that uses reaction torque for dynamic measurement. It is to be noted that, as defined herein, the Brabender units are measured using a sample cup size of 16 fl. oz (about 500 cc), with a 700 cmg cartridge at an RPM of 75. One of ordinary skill in the art also will readily recognize that the Brabender units can be converted to other viscosity measurements, such as centipoises (e.g., cP=BU×2.1, when the measuring cartridge is 700 cmg) or Krebs units, as described therein. The soluble starch has a low viscosity. The viscosity is indicative of starch molecule size and molecular weight such that lower viscosity of the soluble starch generally indicates lower molecular weight and molecule size. For example, in some embodiments, the soluble starch has a viscosity of about 25 BU or less, e.g., from about 1 BU to about 25 BU, from about 1 BU to about 23 BU, from about 1 BU to about 20 BU, from about 1 BU to 19 BU, from about 1 BU to about 15 BU, from about 1 BU to about 12 BU, from about 1 BU to about 10 BU, from about 1 BU to about 8 BU, from about 1 BU to about 5 BU, from about 3 BU to 19.5 BU, from about 3 BU to about 15 BU, from about 3 BU to about 10 BU, from about 3 BU to about 7 BU, from about 5 BU to 19.5 BU, from about 5 BU to about 15 BU, from about 5 BU to about 12 BU, from about 5 BU to about 8 BU, from about 7 BU to 19.5 BU, from about 7 BU to about 15 BU, from about 7 BU to about 12 BU, from about 7 BU to about 10 BU, etc.

The soluble starch and particles of calcium sulfate dihydrate can each be included in the accelerator in any suitable amount. For example, in some embodiments, the starch is present in an amount from about 1% to about 10% by weight of the accelerator, e.g., from about 1% to about 7%, from about 1% to about 5%, from about 1% to about 3%, from about 2% to about 10%, from about 2% to about 7%, from about 2% to about 5%, from about 3% to about 10%, from about 3% to about 7%, from about 3% to about 5%, from about 5% to about 10%, from about 5% to about 7%, or from about 7% to about 10%, by weight of the accelerator. In some embodiments, the calcium sulfate dihydrate is present in an amount from about 90% to about 99% by weight of the accelerator, e.g., from about 90% to about 97%, from about 90% to about 95%, from about 90% to about 92%, from about 92% to about 99%, from about 92% to about 97%, from about 92% to about 95%, from about 95% to about 99%, from about 95% to about 97%, from about 97% to about 99% by weight of the accelerator.

Grinding Materials in Preparation of the Accelerator

Grinding equipment suitable for use in dry milling the gypsum and starch together in accordance with the present disclosure is well-known to the skilled artisan and can include any suitable dry milling assembly, for example, a ball mill such as an Ersham mill. Typically, the mill assembly comprises a cylindrical chamber that rotates around a horizontal axis, partially filled with the material to be ground and the grinding media. For example, the volume of ball grinding media in the cylindrical chamber is from about 40% to about 60%. The diameter of the cylindrical chamber is typically from about 2 feet to about 4 feet. In some embodiments, the milling assembly is jacketed such that it can be water cooled to maintain a constant grinding temperature throughout the mill. In some embodiments, the temperature in the mill assembly does not exceed about 74° C. (about 165° F.). The mill assembly is often vented to remove free moisture from the mill.

Often, the milling assembly operates continuously, with material being fed into the mill at one end and being discharged at the other end. The path of the mill assembly can have any suitable length and typically ranges from about 8 feet (2.4 m) to about 30 feet (9.1 m). The diameter of the mill also varies depending on the size of the mill assembly and typically ranges from 18 inches (45.7 cm) to 60 inches (152.4 cm). The feed rate at which material is introduced into the mill can vary as appropriate and depends, at least in part, on the milling assembly, the size of the mill, the grinding media, the speed of the manufacturing line, and the desired result. The feed rate can range from, for example, about 100 lbs/h (45.5 kg/h) to about 3000 lbs/h (113.6 kg/h) depending on these factors as will be appreciated by the ordinary artisan. In some embodiments, the feed rate is about 180 lbs/h (81.8 kg/h).

The ball grinding media can comprise any suitable material, for example, the grinding media can comprise one or more metals, one or more ceramics, or combinations thereof. Typically the balls comprise a metal selected from the group consisting of stainless steel, carbon steel, chrome alloy steel, and the like. Suitable ceramic materials include zirconia, alumina, ceria, silica, glasses, and the like. Preferably the balls comprise or consist essentially of stainless steel.

In addition, the grinding media used in connection with the mill assembly can have any suitable size and density. The size and density of the grinding media will determine, at least in part, the median particle size of the ground gypsum. Desirably the grinding media have an average diameter of from about 10 mm to about 50 mm. In some embodiments, the grinding media have an average diameter of from about 20 mm to about 40 mm. For example, in some embodiments, the ball grinding media are 1" (25.4 mm) or 1.5" (38.1 mm) diameter balls. The grinding media can have any suitable density, e.g., a density of about 2.5 g/cm3 or greater. In some embodiments, the grinding media have a density of about 4 g/cm3 or greater. For example, the grinding media have a density of about 6 g/cm3 or greater.

In some embodiments, high humidity levels can limit the efficiency of the gypsum grinding process such that it is desirable to maintain a low humidity during the grinding step. In these embodiments, the humidity of the dry grinding chamber typically is about 50% or less, or about 40% or less, about 30% or less, or about 20% or less.

Accelerator prepared using dry gypsum in accordance with the disclosure can be prepared in a batch process or in a continuous process. When the accelerator is prepared in a batch process, the dry gypsum and starch are mixed in a single step. When the accelerator is prepared in a continuous process, the dry gypsum and starch are continuously added to the mixture while a portion of the mixture is continuously removed for use as the accelerator. In one aspect, accelerator is prepared by a process comprising (i) combining dry gypsum and starch to form a mixture and (ii) co-grinding the gypsum-starch mixture for a period of time sufficient to form the accelerator. The gypsum mixture prepared by co-grinding in accordance with step (ii) can be used as the accelerator without further modification. Steps (i) and (ii) can be carried out sequentially or simultaneously.

The co-grinding can occur for any suitable duration to achieve the desired size characteristics as discussed herein. In some embodiments, the grinding occurs for about 5 minutes to about 60 minutes, such as from about 5 minutes to about 30 minutes.

Stucco Slurry

The stucco slurry is normally formed inside a pin or pinless main mixer during the manufacturing process. The slurry is formulated to include the accelerator containing soluble starch in accordance with the present disclosure, water, stucco, foaming agent (sometimes referred to simply as "foam"), retarder, and other additives as desired. Multiple gypsum layers formed from separate gypsum slurries can be used as in embodiments containing a concentrated layer as described in co-pending U.S. patent application Ser. Nos. 15/186,176; 15/186,212; 15/186,232; and Ser. No. 15/186,257, which concentrated layer arrangements are incorporated herein by reference. The stucco can be in the form of calcium sulfate alpha hemihydrate, calcium sulfate beta hemihydrate, and/or calcium sulfate anhydrite. The stucco can be fibrous or non-fibrous. Foaming agent can be included to form an air void distribution within the continuous crystalline matrix of set gypsum. The accelerator can be included in the stucco slurry in any suitable amount, e.g., the accelerator is present in an amount from about 0.5% to about 5% by weight of the calcined gypsum, such as from about 1% to about 3% of the calcined gypsum.

The mode of introduction of additives into the mixer may vary. For example, various combinations of components may be pre-mixed before entering the mixer, e.g., one or more dry additives and/or one or more wet additives may be pre-mixed. By "added to the slurry," as used herein, it will be understood that ingredients may be pre-mixed in any suitable manner prior to entry into the mixer where the gypsum slurry (sometimes called "stucco slurry") is formed as set forth herein. The additives can be included in the gypsum slurry in a wet or dry form. If in a wet form, the additives can be included in any suitable concentration, and could be pre-mixed with other wet additives.

In some embodiments, the foaming agent comprises a major weight portion of unstable component, and a minor weight portion of stable component (e.g., where unstable and blend of stable/unstable are combined). The weight ratio of unstable component to stable component is effective to form an air void distribution within the set gypsum core. See, e.g., U.S. Pat. Nos. 5,643,510; 6,342,284; and 6,632,550. It has been found that suitable void distribution and wall thickness (independently) can be effective to enhance strength, especially in lower density board (e.g., below about 35 pcf). See, e.g., US 2007/0048490 and US 2008/0090068. Evaporative water voids, generally having voids of about 5 µm or less in diameter, also contribute to the total void distribution along with the aforementioned air (foam) voids. In some embodiments, the volume ratio of voids with a pore size greater than about 5 microns to the voids with a pore size of about 5 microns or less, is from about 0.5:1 to about 9:1, such as, for example, about 0.7:1 to about 9:1, about 0.8:1 to about 9:1, about 1.4:1 to about 9:1, about 1.8:1 to about 9:1, about 2.3:1 to about 9:1, about 0.7:1 to about 6:1, about 1.4:1 to about 6:1, about 1.8:1 to about 6:1, about 0.7:1 to about 4:1, about 1.4:1 to about 4:1, about 1.8:1 to about 4:1, about 0.5:1 to about 2.3:1, about 0.7:1 to about 2.3:1, about 0.8:1 to about 2.3:1, about 1.4:1 to about 2.3:1, about 1.8:1 to about 2.3:1, etc. In some embodiments, the foaming agent is present in the slurry, e.g., in an amount of less than about 0.5% by weight of the stucco such as about 0.01% to about 0.5%, about 0.01% to about 0.4%, about 0.01% to about 0.3%, about 0.01% to about 0.2%, about 0.01% to about 0.1%, about 0.02% to about 0.4%, about 0.02% to about 0.3%, about 0.02% to about 0.2%, etc.

The accelerator containing soluble starch of high cold-water solubility (i.e., at least about 25%, e.g., at least about 35%) and low viscosity according to the present disclosure can be used in preparing board of any suitable weight or density. In some embodiments, the accelerator containing soluble starch has particular utility with lower density board, e.g., having a density of about 35 pcf or less where loss of strength can be exacerbated. In some embodiments, to enhance board strength, the stucco slurry further comprises a strength additive such as a pregelatinized starch with viscosity above 25 BU; an uncooked starch as described in U.S. Patent Application 62/550,373; an alkylated starch, etc., as described in, e.g., U.S. Pat. No. 9,540,810, and U.S. patent application Ser. Nos. 13/835,002 and 14/494,547. The strength additive can be included in the stucco slurry, for example, in an amount from about 0.1% to about 20% by weight of the stucco, such as from about 0.5% to about 10% by weight of the stucco.

The stucco slurry can optionally include at least one dispersant to enhance fluidity in some embodiments. Like other ingredients, the dispersants may be included in a dry form with other dry ingredients and/or in a liquid form with other liquid ingredients in the core slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500 L dispersants (BASF), and COATEX Ethacryl M, available from Coatex, Inc.; and/or lignosulfonates or sulfonated lignin. Lignosulfonates are water-soluble anionic polyelectrolyte polymers, byproducts from the production of wood pulp using sulfite pulping. One example of a lignin useful in the practice of principles of embodiments of the present disclosure is Marasperse C-21 available from Reed Lignin Inc.

Lower molecular weight dispersants are generally preferred. Lower molecular weight naphthalenesulfonate dispersants are favored because they trend to a lower water demand than the higher viscosity, higher molecular weight dispersants. Thus, molecular weights from about 3,000 Daltons to about 10,000 Daltons (e.g., about 8,000 Daltons to about 10,000 Daltons) are preferred. As another illustration, for PCE211 type dispersants, in some embodiments, the molecular weight can be from about 20,000 Daltons to about 60,000 Daltons, which exhibit less retardation than dispersants having molecular weight above 60,000 Daltons.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another exemplary naphthalenesulfonate is DAXAD, available from Hampshire Chemical Corp.

If included, the dispersant can be included in the stucco slurry in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, etc.

One or more phosphate-containing compounds can also be optionally included in the stucco slurry, if desired. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate-containing components in accordance with some embodiments of the disclosure can enhance green strength, resistance to permanent deformation (e.g., sag), dimensional stability, etc. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphate can be included in the stucco slurry in a dry form or in a form in water (e.g., a phosphate solution from about 5% to about 20%, such as about a 10% solution). If included, the phosphate can be in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco.

The stucco slurry formulation can be made with any suitable water/stucco ratio, e.g., about 0.4 to about 1.3. For example, in some embodiments, the water/stucco ratio can be from about 0.4 to about 1.2, about 0.4 to about 1.1, about 0.4 to about 1, about 0.4 to about 0.9, about 0.4 to about 0.85, about 0.45 to about 0.85, about 0.5 to about 1.3, about 0.5 to about 1, about 0.5 to about 0.9, about 0.55 to about 0.85, about 0.55 to about 0.8, about 0.6 to about 1.3, about 0.6 to about 1.2, about 0.6 to about 1, about 0.6 to about 0.9, about 0.6 to about 0.85, about 0.6 to about 0.8, etc.

Cover Sheets

The cover sheets can be formed of any suitable material and basis weight. Advantageously, board core formed from slurry comprising migrating starch and strength additive (e.g., uncooked starch, pregelatinized starch, ethylated starch, etc.) provides sufficient strength in board even with lower basis weight cover sheets such as, for example, less than 45 lbs/MSF (e.g., about 33 lbs/MSF to 45 lbs/MSF) even for lower weight board (e.g., having a density of about 35 pcf or below) in some embodiments. However, if desired, in some embodiments, heavier basis weights can be used, e.g., to further enhance nail pull resistance or to enhance handling, e.g., to facilitate desirable "feel" characteristics for end-users.

In some embodiments, to enhance strength (e.g., nail pull strength), especially for lower density board, one or both of the cover sheets can be formed from paper and have a basis weight of, for example, at least about 45 lbs/MSF (e.g., from about 45 lbs/MSF to about 65 lbs/MSF, about 45 lbs/MSF to about 60 lbs/MSF, about 45 lbs/MSF to about 55 lbs/MSF, about 50 lbs/MSF to about 65 lbs/MSF, about 50 lbs/MSF to about 60 lbs/MSF, etc.). If desired, in some embodiments, one cover sheet (e.g., the "face" paper side when installed) can have aforementioned higher basis weight, e.g., to enhance nail pull resistance and handling, while the other cover sheet (e.g., the "back" sheet when the board is installed) can have somewhat lower weight basis if desired (e.g., weight basis of less than 45 lbs/MSF, e.g., from about 33 lbs/MSF to 45 lbs/MSF (e.g., about 33 lbs/MSF to about 40 lbs/MSF).

The Board

Board weight is a function of thickness. Since boards are commonly made at varying thickness, board density is used herein as a measure of board weight. The advantages of the migrating starch in accordance with embodiments of the disclosure can be seen across various board densities, e.g., about 42 pcf or less, such as from about 10 pcf to about 42 pcf, from about 12 pcf to about 40 pcf, from about 16 pcf to about 35 pcf, from about 20 pcf to about 40 pcf, from about 24 pcf to about 37 pcf, etc. However, preferred embodiments of the disclosure have particular utility at lower densities, e.g. from about 12 pcf to about 35 pcf, from about 12 pcf to about 30 pcf, from about 12 pcf to about 27 pcf, from about 16 pcf to about 30 pcf, from about 16 pcf to about 27 pcf, from about 16 pcf to about 24 pcf, from about 18 pcf to about 30 pcf, from about 18 pcf to about 27 pcf, from about 20 pcf to about 30 pcf, from about 20 pcf to about 27 pcf, from about 24 pcf to about 35 pcf, from about 27 pcf to about 35 pcf, from about 27 pcf to about 34 pcf, from about 30 pcf to about 34 pcf, about 27 pcf to about 30 pcf, etc.

In some embodiments, board according to the disclosure meets test protocols according to ASTM Standard C473-10, method B. For example, in some embodiments, when the board is cast at a thickness of ½ inch, the board has a nail pull resistance of at least about 65 lb as determined according to ASTM C473-10, method B (e.g., at least about 68 lb, at least about 70 lb, at least about 72 lb, at least about 75 lb, at least about 77 lb, in each case with any suitable upper limit, such as 110 lb or higher, etc.).

A gypsum layer formed from an accelerator of the present disclosure preferably has an average hardness of at least about 11 lb as determined for a board core according to ASTM C473-10, e.g., at least about 15 lb, at least about 20 lb, at least about 22 lb, etc. For example, in some embodiments, the gypsum layer can have a core hardness of from about 11 lb to about 30 lb, such as, for example, from about 11 lb to about 25 lb, from about 11 lb to about 23 lb, from about 11 lb to about 20 lb, from about 15 lb to about 30 lb, from about 15 lb to about 25 lb, from about 15 lb to about 20 lb, from about 18 lb to about 30 lb, from about 18 lb to about 25 lb, from about 20 lb to about 30 lb, from about 20 lb to about 25 lb, from about 22 lb to about 30 lb, from about 22 lb to about 25 lb, etc.

With respect to flexural strength, in some embodiments, when cast in a board of ½ inch thickness, the board has a flexural strength of at least about 36 lb in a machine direction (e.g., at least about 38 lb, at least about 40 lb, etc., in each case with any suitable upper limit, such as 80 lb or higher, etc.) and/or at least about 107 lb (e.g., at least about 110 lb, at least about 112 lb, etc., in each case with any suitable upper limit, such as 140 lb or higher, etc.) in a cross-machine direction as determined according to the ASTM standard C473. In some embodiments, these standards can be met even with respect to lower density board (e.g., about 35 pcf or less) as described herein.

Preparing the Board

Product according to embodiments of the disclosure can be made on typical manufacturing lines. For example, board manufacturing techniques are described in, for example, U.S. Pat. No. 7,364,676 and U.S. Patent Application Publication 2010/0247937. Briefly, in the case of gypsum board, the process typically involves discharging a cover sheet onto a moving conveyor. Since gypsum board is normally formed "face down," this cover sheet is the "face" cover sheet in such embodiments.

Dry and/or wet components of the gypsum slurry are fed to a mixer (e.g., pin or pin-less mixer), where they are agitated to form the gypsum slurry. The mixer comprises a main body and a discharge conduit (e.g., a gate-canister-boot arrangement as known in the art, or an arrangement as described in U.S. Pat. Nos. 6,494,609 and 6,874,930). In some embodiments, the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/

0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1. Foaming agent can be added in the discharge conduit of the mixer (e.g., in the gate as described, for example, in U.S. Pat. Nos. 5,683,635 and 6,494,609) or in the main body if desired. Slurry discharged from the discharge conduit after all ingredients have been added, including foaming agent, is the primary gypsum slurry and will form the board core. This board core slurry is discharged onto the moving face cover sheet.

The face cover sheet may optionally be in bonding relation with a thin skim coat in the form of a relatively dense layer of slurry. Also, hard edges, as known in the art, can be formed, e.g., from the same slurry stream forming the face skim coat. In embodiments where foam is inserted into the discharge conduit, a stream of secondary gypsum slurry can be removed from the mixer body to form the dense skim coat slurry, which can then be used to form the face skim coat and hard edges as known in the art. If included, normally the face skim coat and hard edges are deposited onto the moving face cover sheet before the core slurry is deposited, usually upstream of the mixer. After being discharged from the discharge conduit, the core slurry is spread, as necessary, over the face cover sheet (optionally bearing skim coat) and covered with a second cover sheet (typically the "back" cover sheet) to form a wet assembly in the form of a sandwich structure that is a precursor to the final product. The second cover sheet may optionally bear a second skim coat, which can be formed from the same or different secondary (dense) gypsum slurry as for the face skim coat, if present. The cover sheets may be formed from paper, fibrous mat or other type of material (e.g., foil, plastic, glass mat, non-woven material such as blend of cellulosic and inorganic filler, etc.).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln). It also is common in the manufacture of gypsum board to use vibration in order to eliminate large voids or air pockets from the deposited slurry. Each of the above steps, as well as processes and equipment for performing such steps, are known in the art.

In some embodiments, the accelerator, when added to a mixture comprising calcined gypsum and water to form set gypsum, allows a time to 50% hydration of calcined gypsum of about 10 minutes or less, such as 8 minutes or less, e.g., from about 0.5 minutes to about 4 minutes. The time to 50% hydration is determined by the time to give off 50% of the total hydration heat, by using a temperature rise set (TRS) test. In the test, a slurry containing calcined gypsum, water, and optional additives (e.g., the accelerator of the present disclosure) is soaked for ten seconds then mixed in a blender for ten seconds at high speed. The slurry is poured into a cup inside an insulated box. A thermal couple is inserted into the slurry. The temperature of the setting slurry is recorded until the temperature stops increasing. The time to reach the average of the starting and end temperatures is defined as the time to 50% hydration.

EXEMPLARY EMBODIMENTS

The invention is further illustrated by the following exemplary embodiments. However, the invention is not limited by the following embodiments.

(1) An accelerator, method of preparing an accelerator, method of hydrating stucco to form set gypsum, slurry, or method of making gypsum board, as described herein.

(2) An accelerator comprising particles of calcium sulfate dihydrate, and starch having a cold water solubility of at least about 25% (e.g., at least about 35%) and a viscosity of about 25 Brabender Units (BU) or less when the starch is in a 30% aqueous slurry at 92° C.

(3) The accelerator of embodiment 2, wherein the particles of calcium sulfate dihydrate have an average particle size of about 60 μm or less, such as about 50 μm or less.

(4) The accelerator of embodiment 2, wherein the particles of calcium sulfate dihydrate have an average particle size of from about 40 μm to about 70 μm, such as from about 50 μm to about 60 μm.

(5) The accelerator of any one of embodiments 2-4, wherein the starch is present in an amount from about 1% to about 10% by weight of the accelerator.

(6) The accelerator of any one of embodiments 2-5, wherein the calcium sulfate dihydrate is present in an amount of from about 90% to about 99% by weight of the accelerator.

(7) The accelerator of any one of embodiments 2-6, wherein the accelerator, when added to a mixture comprising calcined gypsum and water to form set gypsum, allows for a time to 50% hydration of calcined gypsum of about 10 minutes or less, such as 8 minutes or less, e.g., from about 0.5 minutes to about 4 minutes.

(8) A method of preparing an accelerator comprising: (a) providing a mixture comprising calcium sulfate dihydrate and a starch having a cold water solubility of at least about 25% (e.g., at least about 35%) and a viscosity of about 25 Brabender Units (BU) or less when the starch is in a 30% aqueous slurry at 92° C.; and (b) co-grinding the calcium sulfate dihydrate in the presence of the starch to form the accelerator.

(9) The method of embodiment 8, wherein the particles of calcium sulfate dihydrate have an average particle size of about 100 μm to about 150 μm prior to co-grinding, and/or from about 20 μm to about 80 μm after co-grinding.

(10) The method of embodiment 8 or 9, wherein the starch has an average particle size of from about 20 μm to about 100 μm prior to co-grinding.

(11) The method of any one of embodiments 8-10, wherein the starch is present in an amount from about 1% to about 10% by weight of the accelerator.

(12) The method of any one of embodiments 8-11, wherein the co-grinding occurs in a ball mill.

(13) The method of any one of embodiments 8-12, wherein the grinding occurs for about 5 minutes to about 60 minutes, such as from about 5 minutes to about 30 minutes.

(14) A method of hydrating calcined gypsum to form set gypsum, the method comprising: forming a mixture comprising calcined gypsum, water, and an accelerator, the accelerator comprising particles of calcium sulfate dihydrate and starch having a cold water solubility of at least about 25% (e.g., at least about 35%) and a viscosity of about 25 Brabender Units (BU) or less when the starch is in a 30% aqueous slurry at 92° C.

(15) The method of embodiment 14, wherein the hydration rate can be modulated by modifying the amount of accelerator included in the mixture.

(16) The method of embodiment 14 or 15, wherein the accelerator is present in an amount of from about 0.5% to about 5% by weight of the calcined gypsum, such as from about 1% to about 3% by weight of the calcined gypsum.

(17) The method of any one of embodiments 14-16, wherein the time to 50% hydration of the calcined gypsum is about 10 minutes or less, such as 8 minutes or less, e.g., from about 0.5 minutes to about 4 minutes.

(18) A method of preparing gypsum board comprising: (a) providing a first cover sheet; (b) mixing a slurry comprising stucco, water, and an accelerator comprising calcium sulfate dihydrate particles and starch having a cold water solubility of at least about 25% (e.g., at least about 35%), and a viscosity of about 25 Brabender Units (BU) or less when the starch is in a 30% aqueous starch slurry at 92° C.; (c) disposing the slurry between the first cover sheet and a second cover sheet to form an assembly; (d) cutting the assembly into a board; and (e) drying the board.

(19) The method of embodiment 18, wherein the slurry further comprises polyphosphate.

(20) The method of embodiment 19, wherein the polyphosphate is sodium trimetaphosphate.

(21) The method of any one of embodiments 18-20, wherein the slurry further includes a pregelatinized starch.

(22) The method of embodiment 21, wherein the pregelatinized starch has a viscosity of from about 20 centipoise to about 500 centipoise, as measured according to the VMA method.

(23) The method of any one of embodiments 18-22, wherein the slurry further includes uncooked starch having a peak viscosity of from about 100 Brabender Units to about 900 Brabender units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(24) The method of any one of embodiments 18-23, wherein the starch coating is included in an amount from about 1% to about 10%, such as from about 2% to about 5% by weight of the accelerator.

(25) A slurry comprising stucco, water, and an accelerator comprising calcium sulfate dihydrate particles and starch having a cold water solubility of at least about 25% (e.g., at least about 35%) and a viscosity of about 25 Brabender Units (BU) or less when the starch is in a 30% aqueous slurry at 92° C., wherein, when the slurry is used to make a gypsum core disposed between two cover sheets in a board having a density of about 35 pounds per cubic foot (560 kg/m$^3$) or less, the board has a nail pull resistance of at least about 65 lbs-f (e.g., at least about 68 lbs-f, at least about 72 lbs-f, at least about 77 lbs-f, etc.), according to ASTM 473-10, method B.

(26) The slurry of embodiment 25, wherein the slurry further includes at least one uncooked starch having a peak viscosity of from about 100 Brabender Units to about 900 Brabender units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(27) The slurry of embodiments 25 or 26, wherein the slurry further includes a pregelatinized starch.

(28) The slurry of embodiment 27, wherein the pregelatinized starch has a viscosity of from about 20 centipoise to about 500 centipoise, as measured according to the VMA method.

(29) The slurry of any one of embodiments 25-28, wherein the starch is included in an amount from about 1% to about 10%, such as from about 2% to about 5% by weight of the accelerator.

(30) The slurry of any one of embodiments 25-29, wherein the slurry further comprises a polyphosphate.

(31) The slurry of embodiment 30, wherein the polyphosphate is sodium trimetaphosphate.

(32) A gypsum board comprising: (a) a gypsum core having a first face and a second face, the core comprising set gypsum formed from a first slurry comprising water and stucco, and, optionally, accelerator comprising calcium sulfate dihydrate particles and starch having a cold water solubility of at least about 25% (e.g., at least about 35%) and a viscosity of about 25 Brabender Units (BU) or less when the starch is in a 30% aqueous slurry at 92° C.; and (b) a concentrated layer formed from a second slurry of any one of embodiments 25-31, the concentrated layer disposed in bonding relation to the first core face; and, optionally one or more of the following: (i) the concentrated layer has an average core hardness that is at least about 1.5 times greater than the average core hardness of the board core, (ii) when the accelerator is present in forming the core, the concentrated layer is formed from at least about 1.2 times the heat resistant accelerator used in forming the board core, (iii) the board core has a dry density of about 30 pcf or less, (iv) the concentrated layer has a dry density of at least about 1.1 times higher than the dry density of the board core, and (v) the first slurry has a first water-stucco ratio and the second slurry has a second water-stucco ratio, the second water-stucco ratio being at least about 1.2 times higher than the first water-stucco ratio.

(33) A gypsum board comprising: a set gypsum layer disposed between two cover sheets, the core formed from a slurry according to any one of embodiments 25-31, the board having a density of about 35 pounds per cubic foot (560 kg/m$^3$) or less, and a nail pull resistance of at least about 65 lbs-f (e.g., at least about 68 lbs-f, at least about 72 lbs-f, at least about 77 lbs-f, etc.), according to ASTM 473-10, method B.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

EXAMPLES

The following examples further illustrate the invention but, of course, should not be construed as in any way limiting its scope. In the examples, where indicated, accelerator was formed by the use of ball milling. A small bench top ball mill with a ball diameter of 0.6 inches, manufactured by Fritsch Planetary Mill Pulverisette 5 (Oberstein, Germany), was used. However the grinding of the material does not require the use of a ball mill, and other techniques for grinding can be used if desired.

Example 1

This example demonstrates solubility and viscosity differences between dextrose, conventional acid-modified starch, and highly soluble (i.e., at least about 25%, e.g., at least about 35%) acid-modified starch.

Although starch and dextrose have similar chemical composition, their water solubility and molecular weight are significantly different. Two starches were considered, the first being a conventional acid-modified starch, commercially available as LC211 from Archer Daniels Midland Company, Chicago, Illinois. The second starch was an acid-modified highly soluble starch (HS-LC211). The highly soluble acid-modified starch (HS-LC211) was prepared by adjusting acid-modification by increasing reaction temperature and/or time, and level of acid.

The cold-water solubility and Brabender viscosity at 92° C. (about 198° F.), which indicate the molecular weight (higher viscosity indicates higher molecular weight), are listed in Table 1.

TABLE 1

Solubility and Brabender Viscosity

| | Solubility | Viscosity (BU) |
|---|---|---|
| Dextrose (comparative) | >95 | 5 |
| Acid-Modified Starch (LC211) (comparative) | <21 | >40 |
| Highly Soluble Acid-Modified Starch (HS-LC211) | ~60 | 11 |

Example 2

This example demonstrates that a mixture of calcium sulfate dihydrate particles and soluble starch as described herein allows for a heat resistant accelerator (HRA).

By way of background, gypsum (calcium sulfate dihydrate) will go through two endothermal reactions to dehydrate while heating. The first reaction is where the dihydrate form is calcinated to the hemihydrate form, which reaction starts at 250° F. (about 120° C.) and peaks at 310° F. (about 154° C.). The second reaction is where the hemihydrate form is converted to the anhydrous form, which reaction starts at 375° F. (about 190° C.) and peaks at 400° F. (about 204° C.). The results are provided in FIG. 1.

Figure 2:
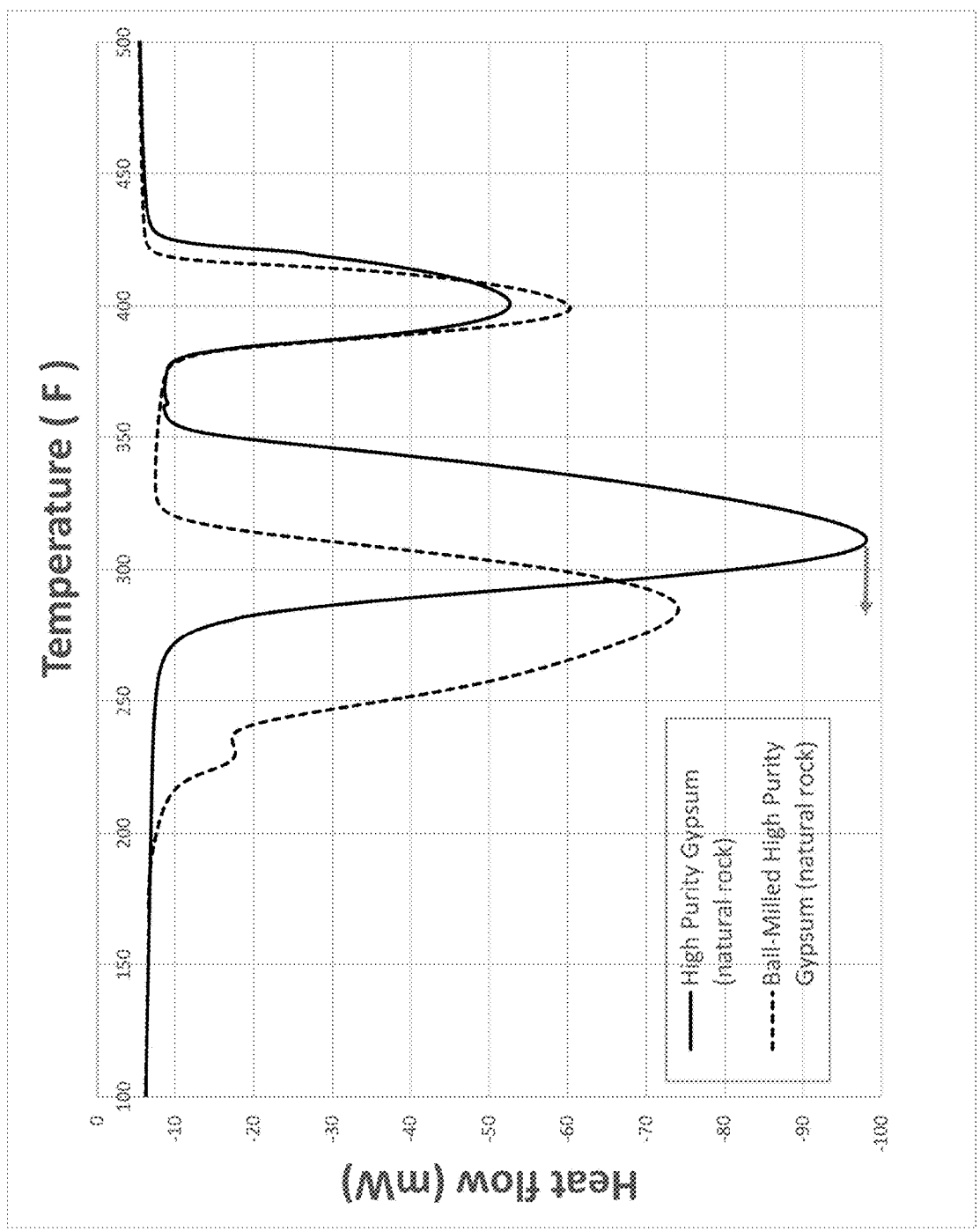
FIG. 2 is a graph of heat flow (Y-axis) versus temperature (X-axis) of the calcination reaction of the ball milling of gypsum as described in Example 2.

Accelerator materials used to accelerate the rate of hydration of calcined gypsum to set gypsum (sometimes referred to as "set accelerator") was prepared by ball milling gypsum (land plaster). The effect on calcination temperature was determined by differential scanning calorimetry (DSC). As seen in FIG. 2, accelerator in the form of ball milled gypsum particles (without any protective additive such as dextrose or starch) shifts the calcination to a lower temperature, starting at 200° F. (about 93° C.) and peaking at 280° F. (about 138° C.). The shift to a lower temperature is undesirable because calcination and heat damage of the set accelerator can occur during preparation of gypsum board as these lower temperatures are reached.

Figure 3:
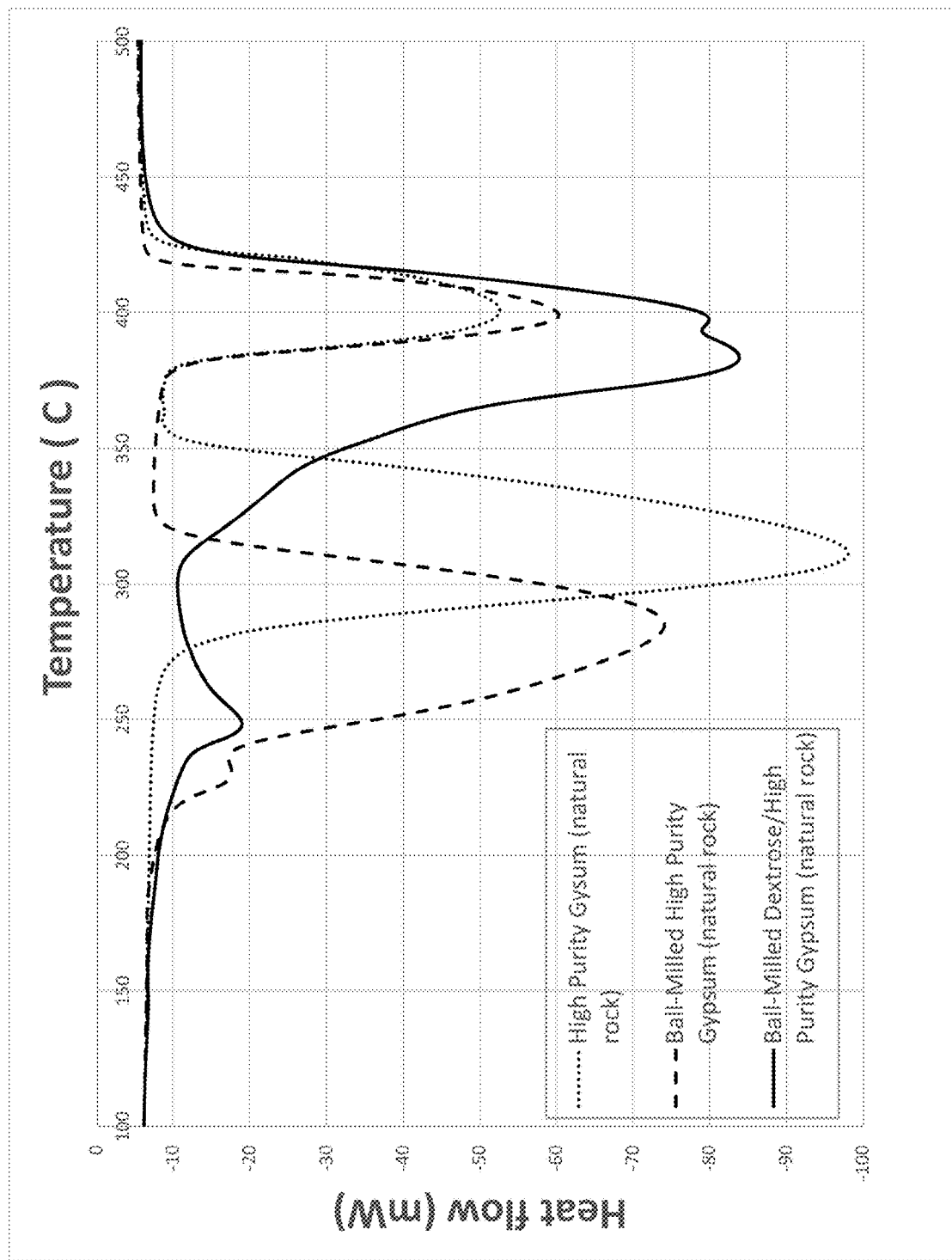
FIG. 3 is a graph of heat flow (Y-axis) versus temperature (X-axis) of the calcination reaction of the ball milling of a mixture of gypsum and dextrose as described in Example 2.
Figure 4:
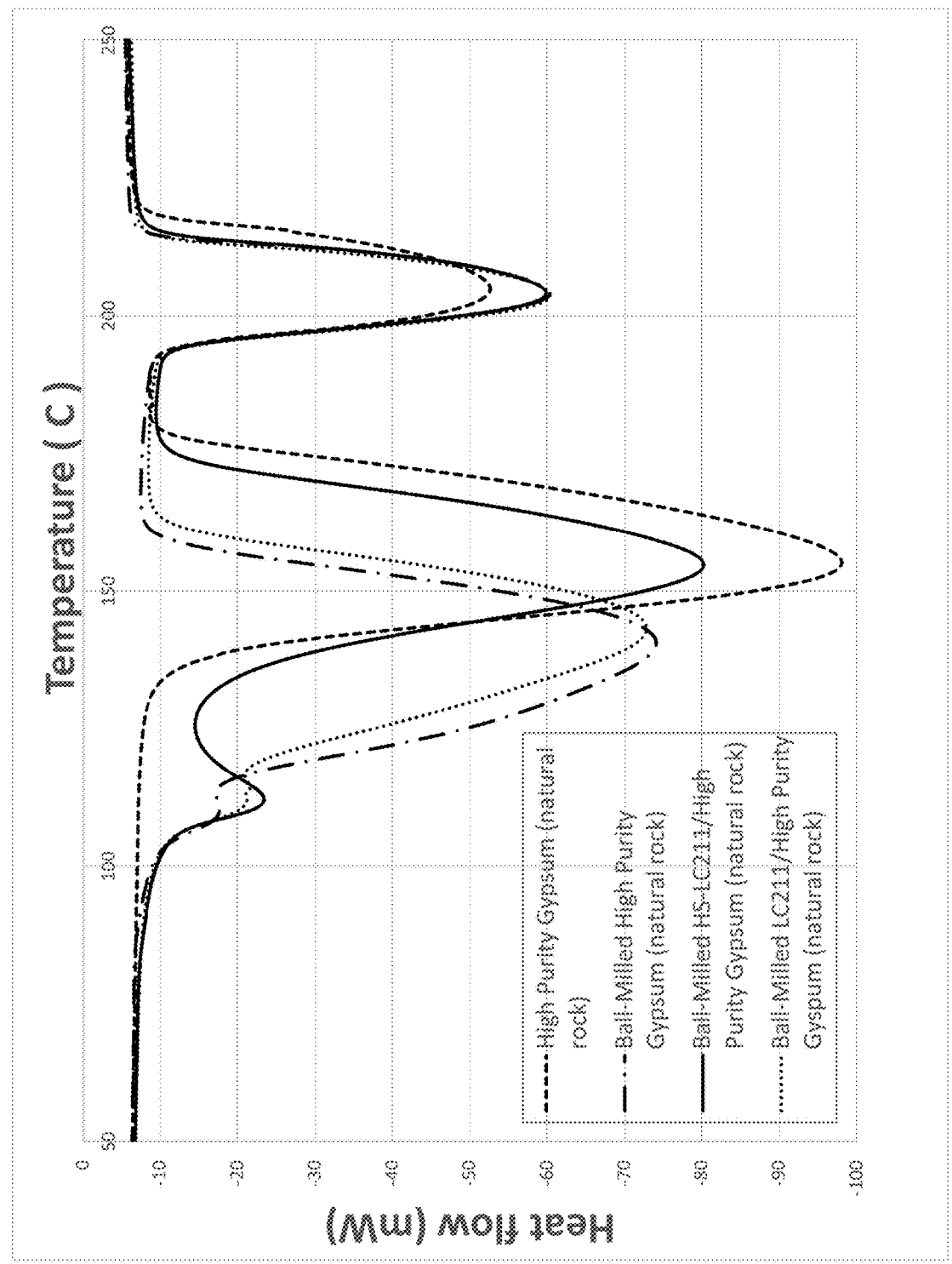
FIG. 4 is a graph of heat flow (Y-axis) versus temperature (X-axis) of the calcination reaction of the ball milling of a mixture of gypsum and highly soluble starch as described in Example 2.

In addition, mixtures of (a) gypsum and dextrose (as in a conventional accelerator), and (b) gypsum and highly soluble starch, were also ball milled to form additional set accelerators. The ball milling was performed for ten minutes and the milled accelerator reached a final temperature of 29° C. (about 84° F.). The effect on calcination temperature is shown in FIGS. 3 and 4, respectively. As seen in FIG. 3, the conventional ball milled mixture of gypsum and dextrose inhibited the shifting of calcination temperature as expected. Surprisingly, the ball milled mixture of gypsum and soluble starch also desirably inhibited the shifting of calcination temperature, as seen in FIG. 4. The results demonstrate that highly soluble starch (HS-LC211) advantageously can improve the heat stability of the accelerator.

The results showed that highly soluble starch can protect an accelerator from calcination during ball milling, which demonstrates heat resistance of such an accelerator. The efficiency of the accelerator is also demonstrated because the highly soluble starch (HS-LC211) protects gypsum seeds from converting to hemihydrate due to heat damage. The results indicate that accelerator made from a mixture of gypsum and highly soluble starch perform similarly with respect to set time, heat resistance, and efficiency as compared with conventional accelerator formed from gypsum and dextrose.

Example 3

This example demonstrates "time to 50% hydration" of fresh and aged accelerators containing gypsum particles from different sources. In particular, this example demonstrates that accelerators containing soluble starch have faster times to 50% hydration as compared with accelerators using conventional acid-modified starch.

Six slurries were made according to the formulation listed in Table 2. The slurries differed with respect to the type of accelerator included.

TABLE 2

Slurry Formulation for TRS Test

| | Weight (g) |
|---|---|
| Stucco | 200 |
| Accelerator | 2 |
| Water | 200 |

The accelerators differed from each other as each accelerator included one of three different gypsums (high purity natural rock; manufacturing plant A synthetic gypsum (syngyp); and manufacturing plant B natural rock). Three accelerators 3A1, 3B1, and 3C1 were formed, by ball-milling the selected gypsum with 5% of highly soluble starch (HS-LC211), as shown in Table 3. As comparatives, each of the three types of gypsum were also formed with 5% conventional acid-modified starch without high solubility (LC-211) to form comparative accelerators 3A2, 3B2, and 3C2, respectively, as shown in Table 4.

The efficiency of the accelerators was compared using a temperature rise set (TRS) test to evaluate a stucco to gypsum hydration reaction using the formulation of Table 2. More particularly, the TRS test is conducted by measuring exothermal heat produced in the stucco to gypsum hydration reaction. Each slurry formulation was soaked for 10 seconds, and then mixed in a Waring blender (model HGBSGYP4) for 10 seconds at the high speed. The slurry was immediately transferred to an insulated container. Temperature rise set was determined by recording the temperature rise of the slurry while the slurry was in the insulated container. The temperature rise of the slurry was used to measure the stucco hydration rate. In this regard, the stucco hydration rate is determined from the temperature rise by the time to reach the average of the starting and final temperatures, with the time being used as the time to 50% hydration. The relationship between time and accelerator efficiency in the TRS is that the shorter the time to reach 50% hydration, the higher the efficiency of the accelerator. The results are provided in Tables 3 and 4, where "BM" refers to ball milled.

Tables 3 and 4: Time to 50% Hydration of Fresh Ball-Milled Accelerators Containing Mixtures of Different Gypsum with Different Starches

TABLE 3

| Accelerator | Gypsum | Time to 50% Hydration (minutes) for BM Highly Soluble Starch (HS-LC211) |
|---|---|---|
| 3A1 | High Purity Natural Rock | 2.42 |
| 3B1 | Manufacturing Plant A Land Plaster | 3.38 |
| 3C1 | Manufacturing Plant B Land Plaster | 3.83 |

TABLE 4

| Accelerator | Gypsum | Time to 50% Hydration (minutes) for BM Acid-Modified Starch (LC211) (comparative) |
|---|---|---|
| 3A2 | High Purity Natural Rock | 2.67 |
| 3B2 | Manufacturing Plant A Land Plaster | 3.63 |
| 3C2 | Manufacturing Plant B Land Plaster | 4.08 |

Figure 5:
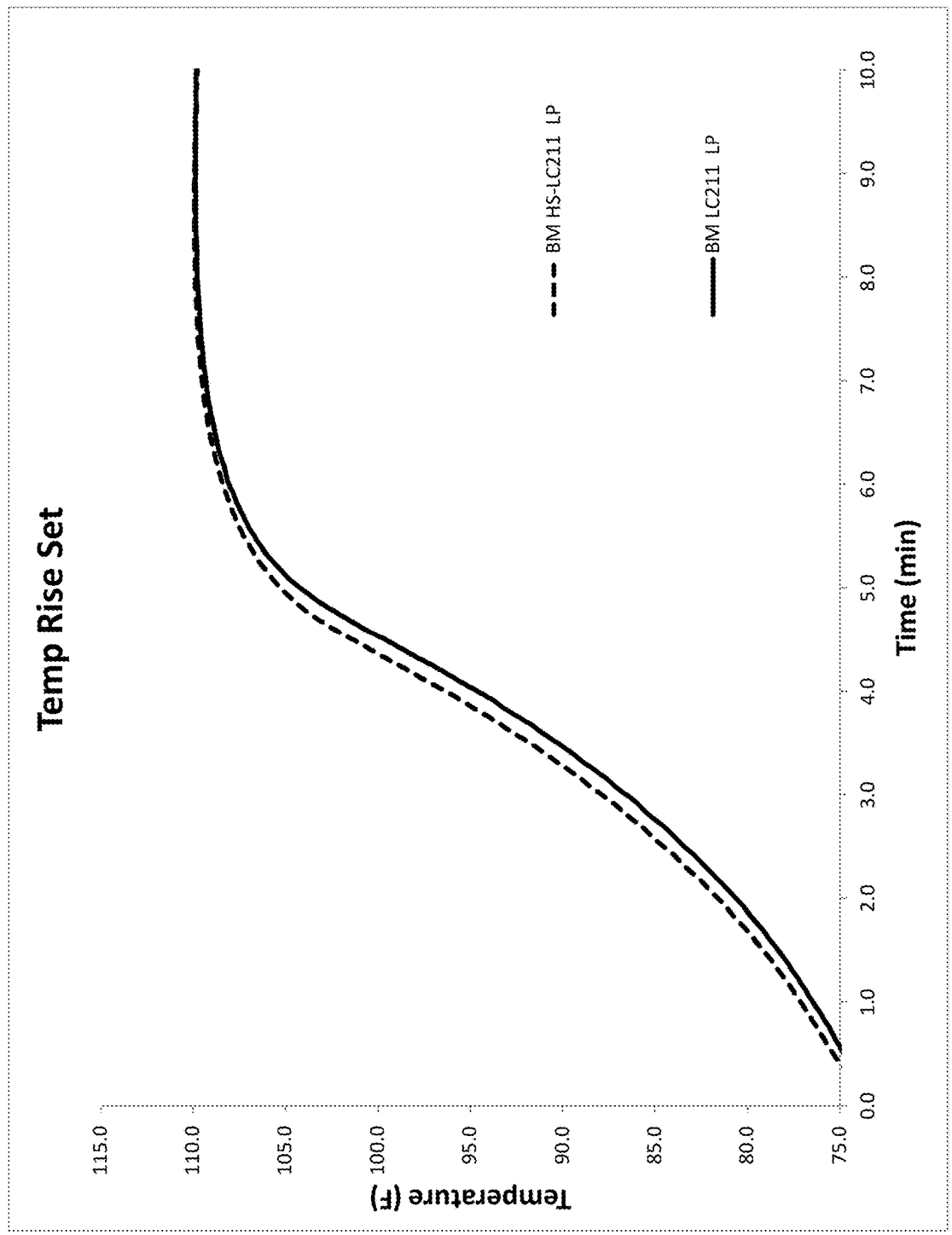
FIG. 5 is a graph of temperature (Y-axis) versus time (X-axis) of the temperature rise set (TRS) observed from ball-milled manufacturing plant A land plaster and starches as described in Example 3.

The results show that the time of 50% hydration of fresh accelerator made from highly soluble starch was of a shorter duration than that of accelerator made from conventional acid-modified starch without high solubility. FIG. 5 shows a typical TRS plot comparing accelerator efficiency made from co-grinding manufacturing plant A land plaster and different starches.

Figure 6:
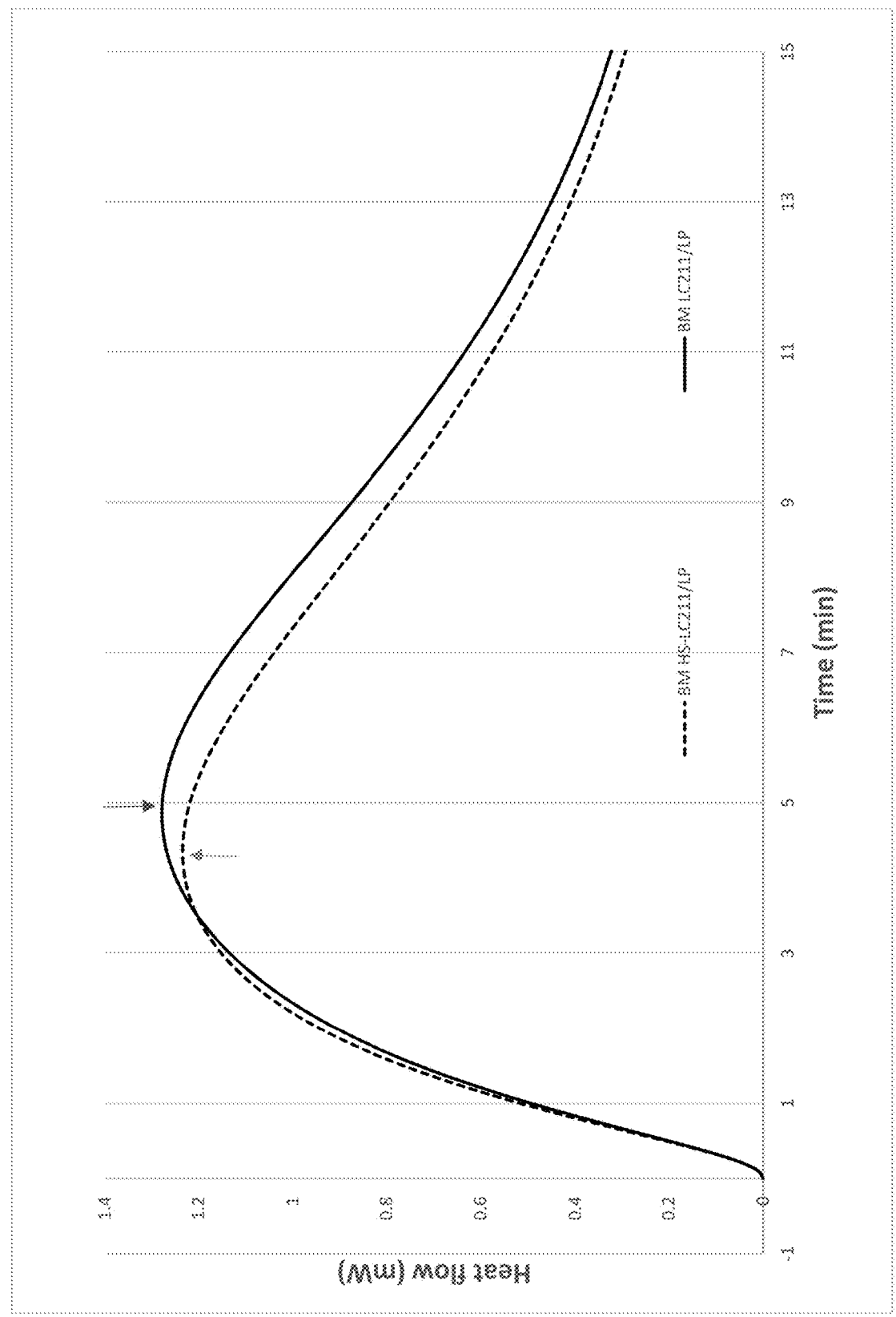
FIG. 6 is a graph of heat flow (Y-axis) versus time (X-axis) of a microcalorimeter of HRA made from ball-milled high purity gypsum in the form of natural rock and different starches as described in Example 3.

The accelerator efficiency was also evaluated by a microcalorimeter. A stucco hydration reaction was evaluated using each of the accelerators, with the microcalorimeter measuring the exothermal heat. The relationship between time and the accelerator efficiency in the microcalorimeter is that the faster it takes to get to maximal heat flow, the higher the accelerator efficiency is. FIG. 6 shows that accelerator made from highly soluble starch reached maximal heat flow faster than the accelerator made from the conventional acid-modified starch.

The efficiency of aged accelerators, numbered 3D1, 3D2, 3D1, and 3E2, was also compared as seen in Tables 5 and 6 (formed from 5% starch). The accelerators were stored in a 70° F. (about 21° C.) and 50% humidity room for three days for aging. The accelerators were then evaluated in a stucco-gypsum hydration reaction using the formulation of Table 2. The respective time to 50% hydration using each of the aged accelerators is provided in Tables 5 and 6.

Tables 5 and 6: Time to 50% Hydration of Aged Ball-Milled Accelerator Containing Mixtures of Different Gypsum with Different Starches

TABLE 5

| Accelerator | Gypsum | Time to 50% Hydration (minutes) for BM Highly Soluble Acid-Modified Starch (HS-LC211) |
|---|---|---|
| 3D1 | High Purity Natural Rock | 4.08 |
| 3E1 | Manufacturing Plant A Land Plaster | 4.58 |

TABLE 6

| Accelerator | Gypsum | Time to 50% Hydration (minutes) for BM Acid-Modified Starch (LC211) (Comparative) |
|---|---|---|
| 3D2 | High Purity Natural Rock | 4.25 |
| 3E2 | Manufacturing Plant A Land Plaster | 4.75 |

Tables 5 and 6 show that aged accelerator made from highly soluble starch had higher efficiency than the accelerator made from conventional acid-modified starch. The results showed that a highly soluble starch can make the accelerator more efficient, even after aging.

Example 4

This example demonstrates that a mixture of calcium sulfate dihydrate particles and 5% soluble starch as described herein is effective at a relatively high accelerator temperature. In this regard, in practice in some embodiments, the temperature of a ground accelerator at a manufacturing facility can be relatively high, e.g., approximately 60° C. (about 140° F.).

Set accelerator was prepared by ball milling gypsum (land plaster) as outlined in Example 2. The mixture was ball milled for 60 minutes and the final temperature of the ground accelerator reached approximately 60° C. (about 140° F.).

Figure 7:
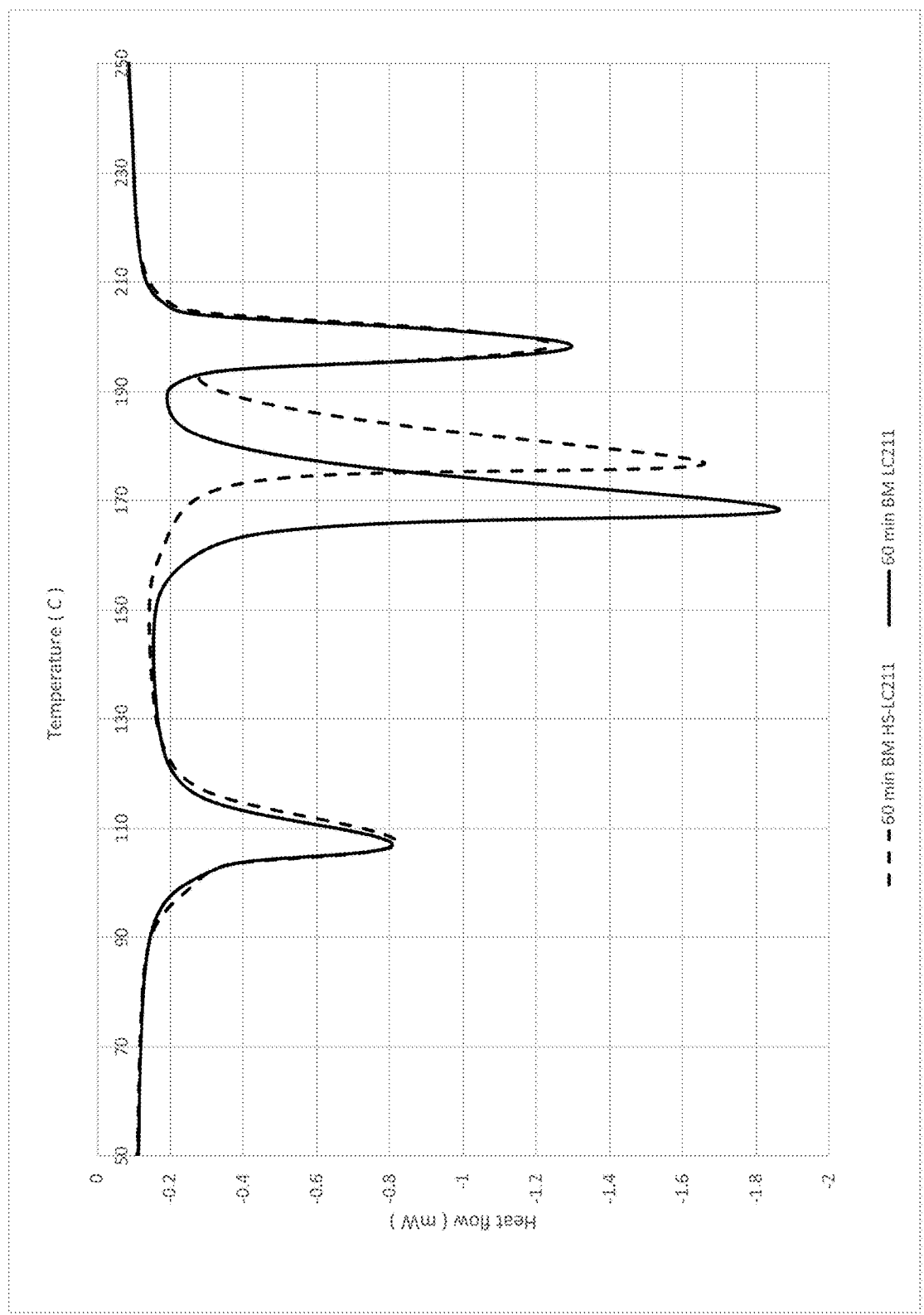
FIG. 7 is a graph of heat flow (Y-axis) versus temperature (X-axis) of the calcination reaction of the ball milling of a mixture of gypsum and highly soluble starch as described in Example 4.
Figure 8:
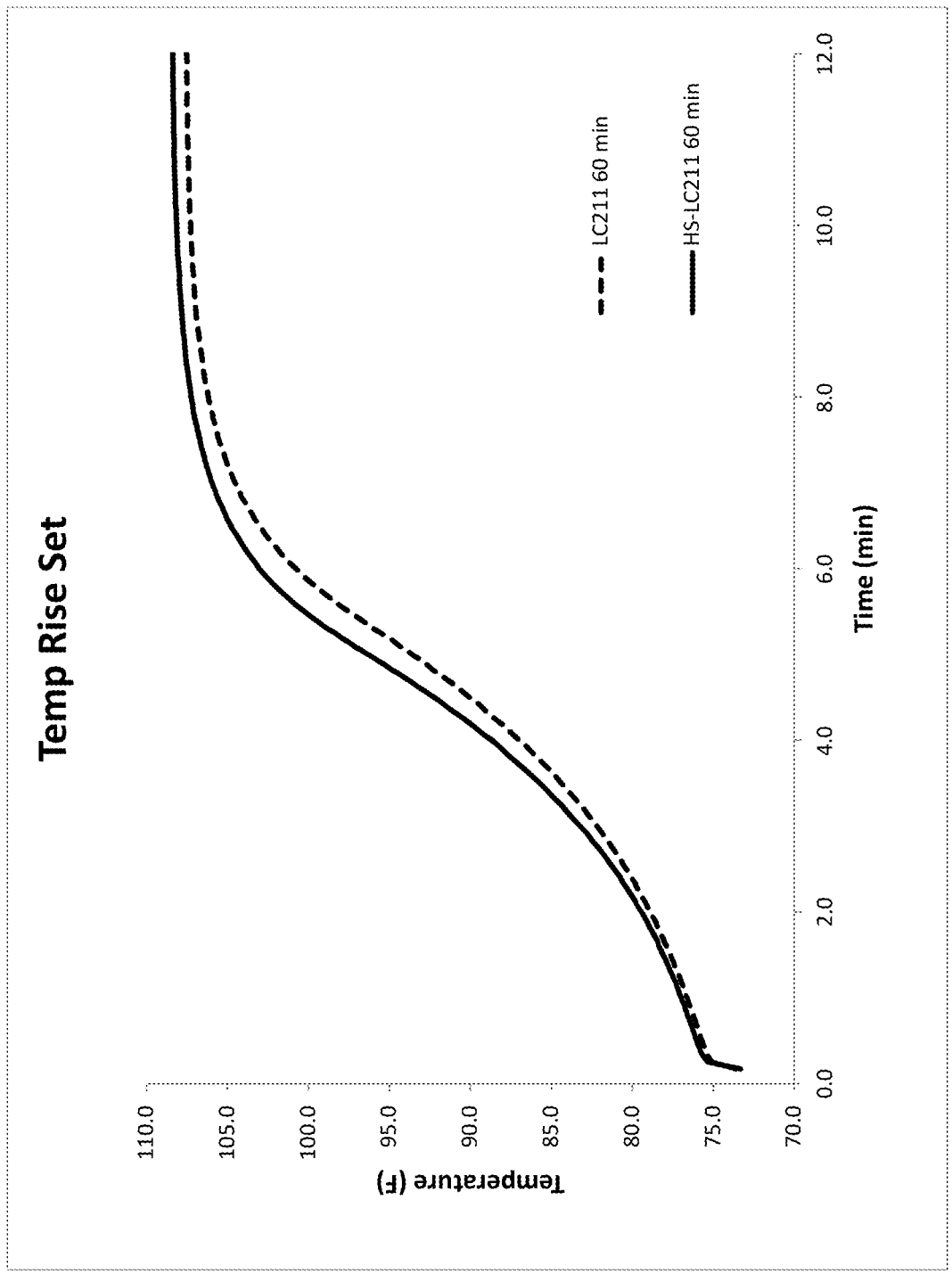
FIG. 8 is a graph of temperature (Y-axis) versus time (X-axis) of the temperature rise set (TRS) observed from laboratory made heat resistant accelerator prepared at higher temperature as described in Example 4.

The effect of the accelerator on calcination temperature was determined by DSC testing during the stucco to gypsum hydration reaction. FIG. 7 shows the calcination temperature shift to higher temperature with highly soluble acid-modified starch (HS-LC211). The ball milled mixture of gypsum and soluble starch at the final temperature of 60° C. (about 140° F.) also desirably inhibited the shifting of calcination temperature, as seen in FIG. 7. The accelerator made by 60 minute ball-milling showed the same trend as the 10 minute ball-milled accelerator described in Example 2, as seen in FIG. 4. FIG. 8 shows the respective times to 50% hydration (as described in Example 3) of 4.42 minutes vs. 4.67 minutes (highly soluble acid-modified starch (HS-LC211) vs. conventional acid-modified starch (LC211)).

The results demonstrate that highly soluble starch can protect an accelerator from calcination even after ball milling for 60 minutes, which demonstrates heat resistance of the accelerator. The efficiency of the accelerator is also shown because the highly soluble starch (HS-LC211) protects gypsum seeds from converting to hemihydrate due to heat damage.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An accelerator for use in accelerating the rate of hydration of calcined gypsum to set gypsum in gypsum slurries for producing gypsum wallboard panels, said accelerator comprising: particles of calcium sulfate dihydrate having an average particle size of from 20 μm to 50 μm, and starch having a cold water solubility of at least about 25% and a viscosity of 25 Brabender Units (BU) or less when the starch is in a 30% solids aqueous slurry at 92° C., wherein the starch is an acid-hydrolyzed starch, and wherein said accelerator has a time to 50% hydration of between 2.42 and 3.83 minutes.

2. The accelerator of claim 1, wherein the starch has a cold water solubility of at least about 35%.

3. The accelerator of claim 2, wherein the accelerator is prepared by co-grinding the calcium sulfate dihydrate in the presence of the starch.

4. The accelerator of claim 3, wherein the starch has an average particle size of from about 20 μm to about 100 μm prior to co-grinding.

5. The accelerator of claim 3, wherein the starch is present in an amount from about 1% to about 10% by weight of the accelerator.

6. The accelerator of claim 3, wherein the co-grinding occurs in a ball mill.

7. The accelerator of claim 3, wherein the co-grinding occurs for a period of from about 10 minutes to about 90 minutes.

8. A method of preparing gypsum board comprising: (a) providing a first cover sheet; (b) mixing a first slurry comprising stucco, water, and an accelerator comprising calcium sulfate dihydrate particles having an average particle size of from 20 μm to 50 μm and starch having a cold water solubility of at least about 25%, and a viscosity of about 25 Brabender Units (BU) or less when the starch is in a 30% solids aqueous starch slurry at 92° C., wherein the starch is an acid-hydrolyzed starch, and wherein said accelerator has a time to 50% hydration of between 2.42 and 3.83 minutes; (c) disposing the first μslurry between the first cover sheet and a second cover sheet to form an assembly; (d) cutting the assembly into a board; and (e) drying the board.

9. The method of claim 8, wherein the first slurry further comprises polyphosphate.

10. The method of claim 8, wherein the first slurry further includes a pregelatinized starch.

11. The method of claim 10, wherein the pregelatinized starch has a viscosity of from about 20 centipoise to about 500 centipoise, as measured according to the VMA method.

12. The method of claim 8, wherein the first slurry further includes uncooked starch having a peak viscosity of from about 100 Brabender Units to about 900 Brabender units when the viscosity is measured by putting the uncooked starch in a second slurry with water at an uncooked starch concentration of 15% solids, and using a Viscograph-E instrument set at 75 rpm and 700 cmg, where the uncooked starch is heated from 25° C. to 95° C. at a rate of 3° C./minute, the second slurry is held at 95° C. for ten minutes, and the starch in the second slurry is cooled to 50° C. at a rate of −3° C./minute.

* * * * *